(12) United States Patent
Viers

(10) Patent No.: US 11,919,447 B2
(45) Date of Patent: Mar. 5, 2024

(54) AUTOMOTIVE CARRIER OVERHEAD HEIGHT DETECTION SYSTEM

(71) Applicant: Barton Edward Viers, Aiken, SC (US)

(72) Inventor: Barton Edward Viers, Aiken, SC (US)

(*) Notice: Subject to any disclaimer, the term of this patent is extended or adjusted under 35 U.S.C. 154(b) by 415 days.

(21) Appl. No.: 17/227,543

(22) Filed: Apr. 12, 2021

(65) Prior Publication Data

US 2021/0347300 A1 Nov. 11, 2021

Related U.S. Application Data

(60) Provisional application No. 63/014,807, filed on Apr. 24, 2020.

(51) Int. Cl.
| | | |
|---|---|---|
| *B60Q 9/00* | (2006.01) | |
| *B60P 3/07* | (2006.01) | |
| *G01B 11/04* | (2006.01) | |

(52) U.S. Cl.
CPC ............... *B60Q 9/008* (2013.01); *B60P 3/07* (2013.01); *G01B 11/043* (2013.01)

(58) Field of Classification Search
CPC .................................. B60P 3/06; B60Q 9/008
See application file for complete search history.

(56) References Cited

U.S. PATENT DOCUMENTS

| | | | | |
|---|---|---|---|---|
| 7,449,996 B2 * | 11/2008 | Hill | .......................... | B60Q 9/00 |
| | | | | 40/592 |
| 7,877,209 B2 * | 1/2011 | Harris | .................... | G08G 1/165 |
| | | | | 701/301 |
| 9,477,894 B1 * | 10/2016 | Reed | .................... | G06V 20/586 |
| 10,360,458 B2 * | 7/2019 | Chaney, Jr. | ............ | G06V 20/56 |
| 10,408,610 B1 * | 9/2019 | Bernard | ............. | G01M 17/027 |
| 10,745,005 B2 * | 8/2020 | Herman | .................... | G06T 7/60 |
| 2012/0139756 A1 * | 6/2012 | Djurkovic | ............. | G08G 1/095 |
| | | | | 340/905 |

FOREIGN PATENT DOCUMENTS

| | | | |
|---|---|---|---|
| BR | PI1104465 A2 * | 8/2013 | |
| CN | 208506969 U * | 2/2019 | |
| WO | WO-2020053493 A1 * | 3/2020 | ......... G01B 11/0608 |

* cited by examiner

*Primary Examiner* — Kevin Kim
(74) *Attorney, Agent, or Firm* — Melissa B. Neely

(57) ABSTRACT

The invention disclosed in this application is design to detect and alarm if any of the vehicles being transported on a vehicle carrier shift in such a manner that the vehicle on the carrier might impact the underside of a highway overpass. The invention also includes a continuous measurement of the carrier height relative to the roadway.

2 Claims, 3 Drawing Sheets

PRIOR ART - REFERENCE

AUTOMOTIVE CARRIER OVERHEAD HEIGHT DETECTION SYSTEM

CROSS REFERENCE TO RELATED APPLICATIONS

Provisional Patent Application No. 63/014,807
Filing Date: Apr. 24, 2020
Relationship: Provisional Application is for the same invention.

STATEMENT REGARDING FEDERALLY SPONSORED RESEARCH OR DEVELOPMENT

This invention was not made by an agency of the United States Government nor under a contract with an agency of the United States Government.

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The Federal Highway Administration sets the specific standards for vertical clearance on roads throughout the United States. For Interstate highways, the vertical clearance must be a minimum of 16 feet over the entire roadway width, including the usable width of the shoulder of the road. The following table summarizes the vertical clearance requirements.

Ranges for Minimum Vertical Clearance in Feet

| Type of Roadway | Rural | Urban |
| --- | --- | --- |
| Freeway | 14-16 | 14-16 |
| Arterial | 14-16 | 14-16 |
| Collector | 14 | 14 |
| Local | 14 | 14 |

(Source: https://safety.fhwa.gov/geometric/pubs/mitigation-strategies/chapter3/3_verticalclearance.cfm, accessed on 04-10-2020)

Automotive carrier trucks which exceed the clearances under highway overpasses can impact the bottom of the overpass and cause significant damage to both the overpass and the vehicles on the carrier resulting in major monetary expenses. Although the height of carrier loads are checked when the vehicles are placed on the carrier, changes can occur during transportation such as shifting of the vehicles which could result in the carrier overall height exceeded the clearance allowances.

Description of Related Art

French patent 2,745,900, granted to Michel Brun on Apr. 17, 1998, relates to a device for determining the height of the vehicles on a carrier relative to the base of the carrier. The Brun patent consists of a laser mounted on a graduated telescoping pole that is affixed to the vehicle carrier (see FIG. 1). By adjusting the length of the pole with the laser at the top, the driver is able to measure the maximum height of the vehicles on the carrier.

U.S. Pat. No. 10,507,766 Vehicle Overhead Clearance Detector (granted Dec. 17, 2019 to James Gable) is for a device mounted on a cargo carrier that projects a laser beam in front of the vehicle positioned and angled to detect any potential overhead obstruction ahead of the carrier and alert the driver.

U.S. Pat. No. 7,877,209 Radar Collision Warning System for Rooftop Mounted Cargo (granted Jan. 25, 2011 to Steven M. Harris, et al.) is similar to the Gable patent but the Harris invention utilizes radar as opposed to a laser. U.S. Pat. No. 7,688,187 Early Detection System and Method for Exterior Vehicle Cargo (granted Mar. 30, 2010 to Andrew J. Caird, et al.) is similar to the Harris patent.

BRIEF SUMMARY OF THE INVENTION

The invention disclosed in this application is sensing and alert system to detect and alarm if any of the vehicles on a vehicle transport carrier shift in such a manner that the vehicle on the carrier might impact the underside of a highway overpass. The invention also includes a continuous measurement of the carrier height relative to the roadway.

DETAILED DESCRIPTION OF THE INVENTION

Figure 1:
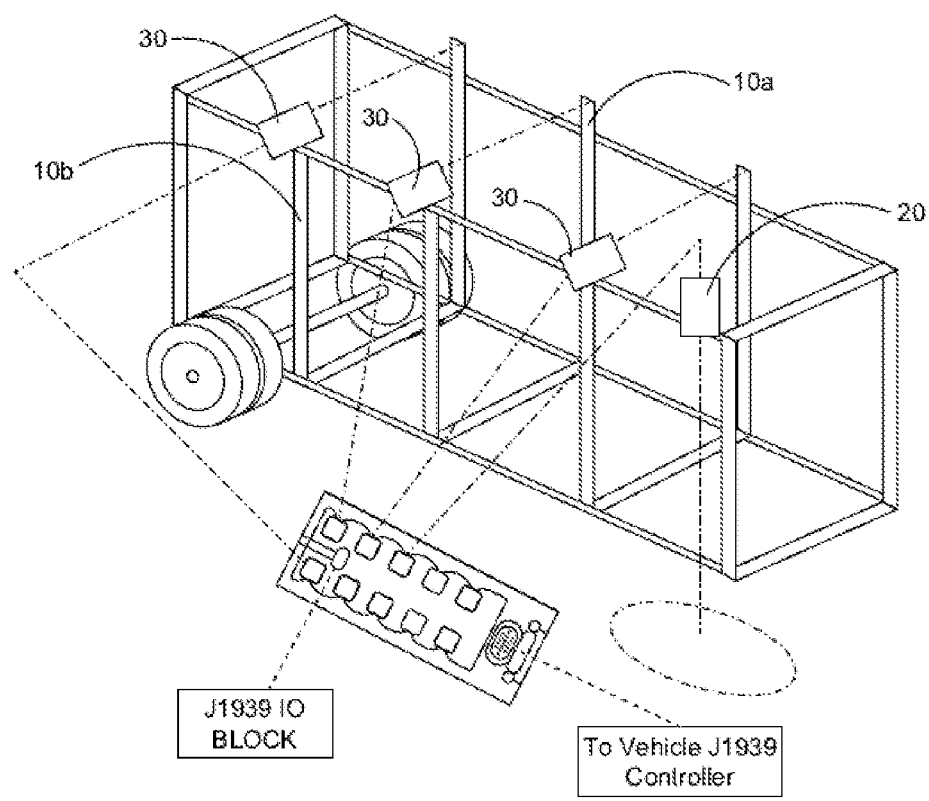
FIG. 1 is a view of an example embodiment of the invention that utilizes four lasers. Laser 1 measures the distance from top of the carrier to the ground. Lasers 2 through 4 are utilized to detect an upwards change in height of the vehicles on the carrier. Although the embodiment depicted shows four lasers, the invention is not limited to four lasers.

The invention disclosed in this application is designed to detect and alarm if any of the vehicles being transported on a vehicle carrier shift in such a manner that the vehicle on the carrier might impact the underside of a highway overpass. The invention also includes a continuous measurement of the carrier height relative to the roadway.

The preferred embodiment of the invention comprises seven vertical posts (10) mounted on either side of the vehicle carrier with three posts (10a) on one side of the vehicle carrier and four posts (10b) on the other side of the vehicle carrier. The posts (10) are of such a length and affixed to the vehicle carrier in such a manner as to not exceed the clearance requirements for highway overpasses and signs. Three sets of the posts (10a, 10b) are positioned such that a set of posts are across from one another. Four lasers (20, 30) are positioned at the top of the each of the four poles (10b) on the side of the vehicle carrier. The lasers are interfaced with the carrier truck's J1939 controller. 018. Three laser sensors (30) with a 10 foot obstacle detection range are situated on top of three of the posts (10b) such that the laser beam is horizontal across the top of the vehicle carrier. If a vehicle on the carrier shift and breaks the beam of any of three lasers (30), an alarm signal will be sent to the driver via wireless communication. The alarm signal will also be sent via wireless to the vehicle carrier's home terminal.

The fourth laser (20) is situated on the top of one of the four posts (10b) such that the beam is oriented towards the ground. The function of this laser measurement sensor is to determine the distance from the top of the post to the ground. This sensor will provide continuous height measurements to the vehicle carrier's driver.

Failure of any of the lasers (20, 30) will also be signaled to the driver and the vehicle carrier's home office.

Although the preferred embodiment of the invention utilizes four lasers (20, 30) and seven posts (10), it should be noted that the invention is not limited to these numbers. More or fewer lasers and posts could be utilized in alternative embodiments of the invention.

An alternative embodiment of the invention would replace the lasers (30) with infrared light emitting diodes and corresponding photodetectors on the opposite posts (10a). (The infrared light emitting diodes would replace Lasers 2 through 4 from FIG. 1). If a vehicle on the carrier shifts and interrupts the beam from the infrared light emitting diode to its corresponding photodetector, an alarm signal would be wirelessly transmitted to the driver and the vehicle carrier's home terminal.

The invention system will be constructed of materials available on the commercial market including the lasers or infrared light emitting diodes. All electronic components will meet Society of Automotive Engineers (SAE) J1939 protocols.

The present invention differs from the prior art significantly. The Brun invention (FR 2,745,900) utilizes a laser as can the present invention, but the Brun invention is utilizing a single laser combined with a physical measuring stick to measure the distance from the top of the highest vehicle on the carrier to the base of the vehicle carrier. It does not continuously monitor for upward shifts in the vehicle carrier's load nor measure the continuously measure the distance to the ground. With the Brun invention, upward shifts in the vehicle carrier's load would only be detected if the driver stopped the carrier and took another measurement.

The three US patents (U.S. Ser. No. 10/507,766, U.S. Pat. Nos. 7,877,209, and 7,688,187) are all for systems designed to detect if a potential overhead obstacle is ahead of the cargo carrier. Like the French patent, these patents do not monitor for upward shifts in the cargo being carried nor provide continuous measurement of the distance to the ground.

Potential CPC patent classifications for this invention include:
Class B60—Vehicles in General
  Subclass B60Q—Arrangement of Signaling or Lighting Devices, The Mounting or Supporting Thereof or Circuits Therefore, For Vehicles in General
    Subclass B60Q 9/008—Arrangement of adaptations of signal devices not provided for in one of the preceding main groups for anti-collision purposes.

Figure 2:
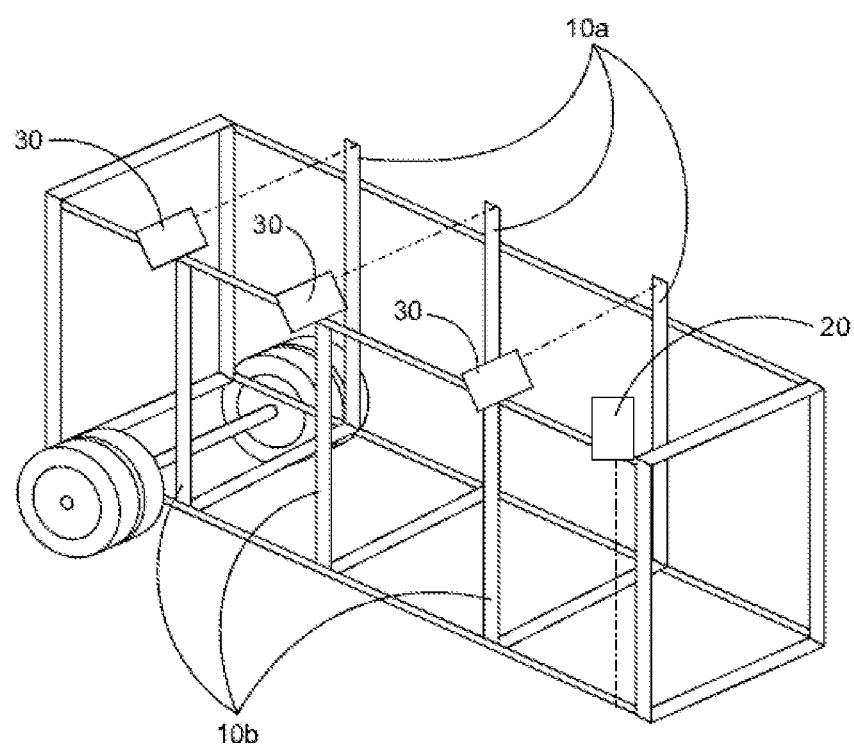
FIG. 2 is view of the example embodiment of the invention that utilizes seven poles (10) and four lasers (20, 30).
Figure 3:
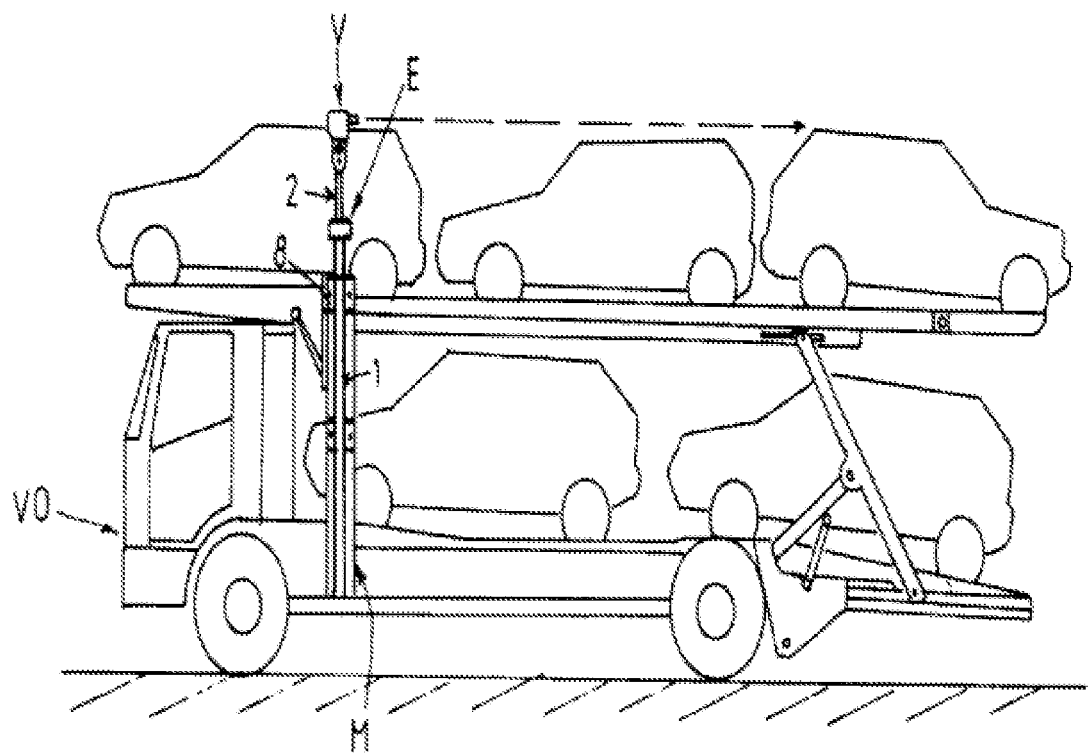
FIG. 3 is a reference drawing from the prior art (FR 2745900).

The present invention described above and illustrated in FIGS. 1 and 2 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention be not limited to the exact forms and details described and illustrated herein but falls within the scope of the appended claims.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with, or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A system for the detection and subsequent alarm for an upward movement of vehicles on a vehicle transport carrier such that a vehicle would be at such a height as to impact the underside of a highway overpass where said system comprises two or more vertical posts mounted to the sides of the vehicle transport carrier with a laser measurement sensor mounted at the top to one of said vertical posts where said laser measurement sensor measures the distance from its position to the ground and provides the measured distance to the ground on a continuous basis to said vehicle transport carrier's driver and said vehicle transport carrier's home terminal, and laser obstacle sensors mounted on one or more of said vertical posts where said laser obstacle sensors are positioned to detect an upward movement of vehicles on said vehicle transport carrier and where said laser obstacle sensors provide an alarm to the vehicle transport carrier driver and said vehicle transport carrier's home terminal if said laser obstacle sensor detects an obstruction.

2. A system for the detection and subsequent alarm for an upward movement of vehicles on a vehicle transport carrier such that a vehicle would be at such a height as to impact the underside of a highway overpass where said system comprises two or more vertical posts mounted to the sides of the vehicle transport carrier with a laser measurement sensor mounted at the top to one of said vertical posts where said laser measurement sensor measures the distance from its position to the ground and provides the measured distance to the ground on a continuous basis to said vehicle transport carrier's driver and said vehicle transport carrier's home terminal, and infrared light emitting diodes are mounted on one or more of said vertical posts with corresponding photo detectors mounted on said vertical post opposite the infrared light emitting diodes where said infrared light emitting diodes and corresponding photodetectors are positioned to detect an upward movement of vehicles on said vehicle transport carrier provide an alarm to the vehicle transport carrier driver and said vehicle transport carrier's home terminal if the infrared light beam between said infrared light emitting diode and corresponding photodetector is interrupted.

* * * * *